April 19, 1932.   R. W. THOMAS   1,854,352
CUSTOMER'S EQUIPMENT FOR STORING AND DISPENSING LIQUEFIED GAS
Filed Jan. 31, 1930
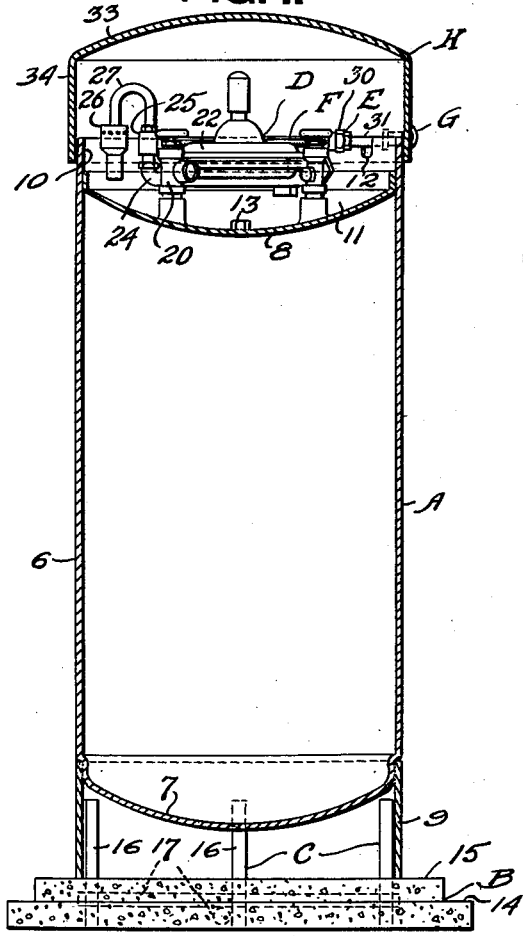
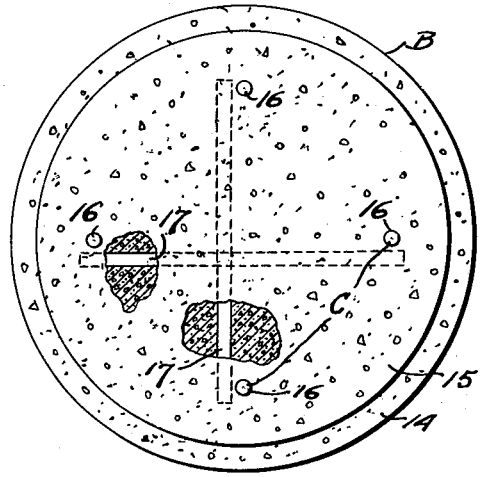
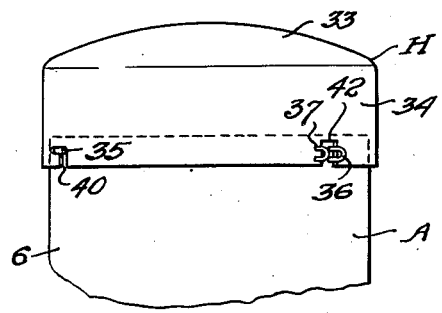
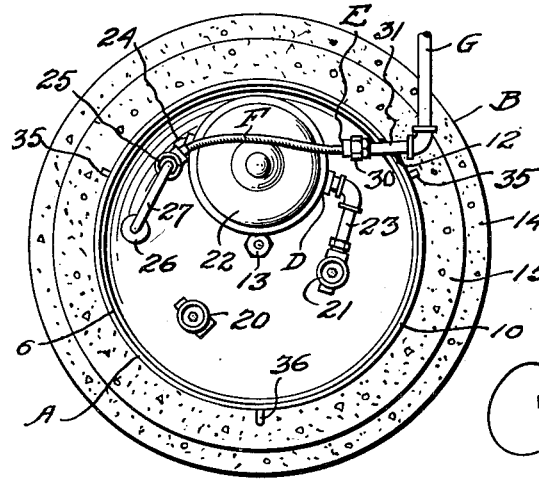
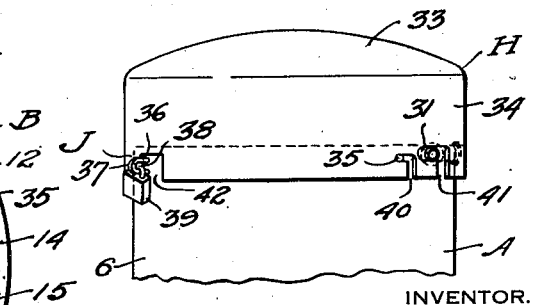
INVENTOR.
Rosswell W. Thomas
BY Lancaster and Allwine
ATTORNEYS.

Patented Apr. 19, 1932

1,854,352

UNITED STATES PATENT OFFICE

ROSSWELL W. THOMAS, OF DETROIT, MICHIGAN, ASSIGNOR TO PHILLIPS PETROLEUM COMPANY, OF BARTLESVILLE, OKLAHOMA, A CORPORATION

CUSTOMER'S EQUIPMENT FOR STORING AND DISPENSING LIQUEFIED GAS

Application filed January 31, 1930. Serial No. 425,021.

The present invention relates to equipment adapted to be installed at customers' premises for storing and dispensing liquefied gas, such as propane, at superatmospheric pressure.

The principal objects of the invention are, to provide customers' equipment which is neat in appearance, for such is frequently placed where exposed to view of neighbors and passers-by; compact, for the space available for its location is often limited; and comparatively inexpensive to produce, consistent with the proper factors of safety, for equipment of this class is used to a large extent in connection with cooking, heating and lighting equipment in sections where piped natural or artificial gas is not available, and the initial outlay for the equipment is often an item of considerable consequence when deciding whether or not to purchase or lease the equipment which makes for comfort and convenience.

Another object of the invention is to provide equipment which is susceptible of use in carrying out the method of distribution of liquefied gas disclosed in the application for Letters Patent of Paul S. Endacott, filed May 26, 1928, Serial No. 280,746, according to which the servicing of customers is such that the supply of liquid gas is replenished in the customer's tank, from time to time, without removing the tank from the premises and the customer billed for the product supplied, by weighing the tank and its contents before and after replenishment of the supply in the tank. This weighing and replenishment of supply is preferably accomplished without shutting off the supply to the customer's cooking, heating and/or lighting equipment and hence reasonable care must be exercised to see that the service conduit line is not interrupted or broken. The equipment of the present invention is such that this weighing may be accomplished relieving the attendant to some extent in his exercise of reasonable care by guiding the tank in its movement during the weighing operation so that it is not likely to tip over or disturb portions of the service conduit line likely to be ruptured or broken.

Other objects and advantages of the invention will appear in the following detailed description, taken in connection with the accompanying drawings, forming a part of this specification and in which drawings:

Figure 1 is a view partly in elevation and partly in vertical section thru a typical example of customers' equipment for storing and distributing liquefied gas according to the present invention.

Figure 2 is a plan view of the equipment with a tank cover removed and showing the parts exposed during the weighing operation.

Figure 3 is a plan view of a base for the tank, parts being broken away to disclose possible details.

Figure 4 is a fragmentary elevation of the upper portion of the tank and its cover and showing the relative position of parts when the cover may be lifted or moved from the tank.

Figure 5 is a view similar to Figure 4 but showing the cover in a locked position.

In the drawings, wherein similar characters refer to similar parts thruout the views, A designates the customer's tank of a nature suitable for receiving liquefied gas under superatmospheric pressure; B a base upon which the tank A is mounted and preferably including means C for guiding the tank in its movement during the weighing operation and so that it cannot be tipped off the base; D suitable equipment or devices for the control of the liquefied gas in tank A; E a service conduit line, in the example shown including a flexible section F and a rigid section G; H a cover for the tank A to normally enclose the devices D; and J means to retain the cover on the tank against tampering.

The tank A is preferably cylindrical in shape and includes a lateral or major wall portion 6, bottom wall 7, top wall 8 and a minor wall portion or skirt 9. The bottom wall 7 preferably bulges downwardly within the confines of minor wall portion 9, so that when this minor wall portion or skirt rests upon the base A, the bottom wall 7 is spaced from the base. Thus, if the base B is made of some comparatively inexpensive material as cement and suitable aggregate having a tendency to absorb moisture, there is little if any danger of this moisture being conveyed to the bottom wall and hence corrosion is to a great extent obviated by this construction. The top wall 8 preferably bulges inwardly and is preferably spaced below the upper marginal portion 10 of wall 6 so that a chamber 11 is provided which may partially or wholly accommodate the devices D. The upper marginal portion 10 of wall 6 is provided with an opening 12, for a purpose to be subsequently set forth, preferably leading from the upper edge of the wall, and the top wall 8 may be provided with a nut or screw threaded socket 13 at its center, welded or otherwise secured thereto to facilitate weighing of the tank A and its contents, in a manner described in my copending application for Letters Patent filed October 8, 1929, Serial No. 398,239.

The main body of base B is, by way of example, stepped as at 14 and 15, the portion 14 being relatively large so as to afford a spread foundation upon the ground and the reduced portion 15 adds to the appearance of the base and may be considered an economical measure, reducing the amount of concrete required in its production. The means C for guiding the tank in its movement and to prevent tipping of the tank off the base preferably comprises spaced upstanding elements 16, such as rods embedded in the base B. In the example shown these rods 16 are spaced so as to be in confronting relation to the tank wall in a manner that, while they will not interfere with the weighing operation, they are in such proximity to the tank wall that the tank cannot be tipped off the base or, when lifted, swung laterally to such an extent as to be likely to damage the service conduit line E. Reinforcing rods or bars 17 may be embedded in base B in close proximity to the rods 16, thus strengthening the base and means C.

The equipment D for the control of the liquefied gas in tank A, in the example shown comprises an inlet valve 20 thru which the propane or other liquefied gas under superatmospheric pressure may be introduced into the tank A; a valve 21 for control of the outlet of the contents of the tank; a pressure regulator 22 having communication with valve 21 as by pipe line 23; a pressure regulator outlet line 24 including a T fitting 25 and a safety device 26, such as a mercury seal having communication with the outlet of the pressure regulator as by goose neck 27. These devices making up the equipment B for control of the liquefied gas in tank A are preferably, to a large extent, in the chamber 11 of the tank altho they may extend upwardly beyond the tank major wall portion 6. They are preferably encompassed by the plane of said major wall portion, so that the tank may, if desired, be rolled on a surface such as the floor without injury to the said devices.

The flexible section F of the service conduit line E is preferably flexible pipe or tubing and in the example shown has connection with the aforementioned T fitting 25 and with the rigid section G as by a union 30, connected to a pipe length 31 of section G. The section G of course may be secured to the building or some rigid object on the premises where the equipment is located and the assembly is such that this pipe length 31 extends thru the opening 12 in the upper marginal portion 10 of tank A, with sufficient play that the tank may be lifted off base B without this rigid section of the service conduit line interfering with the weighing operation.

The cover H is preferably dome-like in shape including a top 33 and a skirt 34, the cover being directly carried by the tank and in telescopic relation therewith. The dome-like top 33 will shed water, and with the skirt 34 telescoping the outside of tank A will prevent moisture running down the skirt from entering the chamber 11. It is to be distinctly understood that the term "dome-like" as used in this specification is used to broadly designate a cover comprising a top 33 of any suitable shape, not necessarily concavo-convex as shown, and a skirt 34, so that it may have telescopic relation with the end portion of the tank.

As suitable means for retaining the cover on the tank A, the latter may be provided with a plurality of radially extending spaced lugs 35 adjacent the upper margins of the tank and an eye member 36 for cooperation with a corresponding eye member 37 and the cover, these eye members receiving the shackle 38 of a padlock 39, in the example shown. The lugs 35 are received in bayonet slots 40 leading from the lower marginal portion of skirt 34 and this skirt is also provided with a major bayonet slot 41 for accommodation of the pipe length 31, and an opening 42 for accommodation of the eye member 36. In Figure 4 the cover H is in a position where it may be lifted from the tank so as to expose the devices D. In Figure 5 is shown the relative position of the parts after the cover has been moved circumferentially to that extent where the lugs 35 are in the dead ends of the bayonet slots 40, and where the eye members 36 and 37 are in such relative position that they may receive the shackle 38 of padlock 39. It is to be observed also that the pipe length 31 is held firmly against vibration, being disposed in the dead or closed end of the major bayonet slot 41.

According to the present invention it is not necessary to provide an outer jacket or casing of the character shown in the aforesaid application, Serial No. 280,746 since the tank A and cover H may be given such finish as is pleasing in appearance and of a nature to preserve the equipment against corrosion. Thus the cost of the equipment is materially reduced and it may be placed where space for its accommodation is limited.

In order to gain access to the devices D for the control of the liquefied gas, the lock 39 may be removed, the cover H moved circumferentially and subsequently lifted when the lugs 35 and the pipe length 31 is in such position relative to the outlets of their respective bayonet slots that this lifting may be accomplished. The usual procedure is to then weigh the tank in order to determine whether it is necessary to replenish the supply and for the purpose of billing the customer for the liquefied gas which has been used. In this weighing operation the tank A is lifted from the base B, but is guided so as to move substantially vertically, by the means C. Because of the flexible section F of service conduit line E, and the opening 12 in tank A accommodating a portion of the rigid section G, this lifting may be accomplished without danger of disturbing the service conduit line to that extent where a leak is likely to result.

Various minor changes in details of construction, proportion and arrangement of parts may be resorted to, when required, without sacrificing any of the advantages of the invention, as defined in the appended claims.

I claim:

1. In customers' equipment for dispensing liquefied gas, the combination of a tank of a nature suitable for receiving liquefied gas under superatmospheric pressure including a lateral wall portion provided with an opening at its upper portion and a bottom wall and a top wall, the latter being disposed below the upper margin of the major wall portion and below said opening, devices for control of the egress of the liquefied gas from the tank carried by said top wall, and a service conduit line including a flexible portion operatively connected to said control devices and a rigid portion passing loosely thru the said opening in the tank, whereby the tank may be lifted without disturbing said rigid portion.

2. In customers' equipment for dispensing liquefied gas, the combination of a tank of a nature suitable for receiving liquefied gas under superatmospheric pressure, including a lateral wall portion provided with an opening at its upper portion and a bottom wall and a top wall, the latter being disposed below the upper margin of the major wall portion and below said opening, devices for control of the egress of the liquefied gas from the tank, carried by said top wall, a service conduit line including a flexible portion operatively connected to said control devices and a rigid portion passing loosely thru the said opening in the tank whereby the tank may be lifted without disturbing said rigid portion, and a movable dome-like cover for said tank in telescopic relation to the upper end thereof and provided with an opening leading from the lower margin of the cover to accommodate the said rigid portion of said service conduit line, said cover enclosing said control devices.

3. In customers' equipment for dispensing liquefied gas, the combination of a tank of a nature suitable for receiving liquefied gas under superatmospheric pressure including a lateral wall portion provided with an opening at its upper portion and a plurality of radially extending spaced lugs adjacent its upper margin and a bottom wall and a top wall, the latter being disposed below the upper margin of the major wall portion and below said opening, devices for control of the egress of the liquefied gas from the tank carried by said top wall, a service conduit line including a flexible portion operatively connected to said control devices and a rigid portion passing loosely thru the said opening in the tank, whereby the tank may be lifted without disturbing said rigid portion, and a detachable dome-like cover for said tank in telescopic relation to the upper end thereof and provided with bayonet slots for the accommodation of said lugs of the tank and the said rigid portion of said service conduit line, said cover enclosing said control devices.

4. In customers' equipment for dispensing liquefied gas, the combination of a base, a portable elongated tank of a nature suitable for receiving liquefied gas under superatmospheric pressure, said tank including a bottom wall and a skirt at its lower end, the latter resting upon said base and spacing the bottom wall of the tank from the base, and a plurality of spaced uprights carried by said base and in confronting relation to the internal face of said skirt to prevent the tank being tipped off said base.

5. In customers' equipment for dispensing liquefied gas, the combination of a base, a portable elongated tank of a nature suitable for receiving liquefied gas under superatmospheric pressure, the tank including a bottom wall and a skirt resting upon said base, spacing the said bottom wall therefrom and disposing the tank in an upright position, and means carried by said base and extending into said skirt to prevent tipping of the tank off said base.

6. Customer's equipment for dispensing liquefied gas comprising, a portable tank for liquefied gas under superatmospheric pressure, means movably supporting said tank so that it may be lifted for weighing the tank and its contents, a pressure regulator rigid with the tank and in communication therewith so as to emit the contents of the tank from the regulator at reduced pressure and in a gaseous phase changed form, and a service conduit line including a flexible section operatively connected to the outlet of said pressure regulator and a rigid section connected to said flexible section, so that the flexible section is subjected to a considerably lower pressure than the tank and so that the tank may be lifted for weighing purposes without disturbing said rigid section of the service conduit line.

7. Customer's equipment for dispensing liquefied gas comprising, a portable elongated tank for liquefied gas under superatmospheric pressure, means movably supporting said tank in an upright position so that it may be lifted for weighing the tank and its contents, a pressure regulator rigid with the tank at the upper end portion thereof and in communication with the tank so as to emit the contents thereof from the regulator at reduced pressure and in gaseous phase changed form, and a service conduit line including a flexible section operatively connected to the outlet of said pressure regulator and a rigid section connected to said flexible section, so that the flexible section is subjected to a considerably lower pressure than the tank and so that the tank may be lifted for weighing purposes without disturbing said rigid section of the service conduit line.

ROSSWELL W. THOMAS.